(12) United States Patent  
Tani et al.

(10) Patent No.: US 8,449,359 B2
(45) Date of Patent: May 28, 2013

(54) STRUCTURE FOR INSTALLING AIR-CONDITIONING DUCT TO AIR-CONDITIONING UNIT

(75) Inventors: Naoto Tani, Nagoya (JP); Kouji Yamashita, Kariya (JP); Hayato Kamigashima, Kariya (JP); Nobuhiro Ichimura, Kariya (JP)

(73) Assignees: Kyoraku Co., Ltd., Kyoto-shi, Kyoto (JP); Toyota Shatai Kabusiki Kaisha, Kariya-shi, Aichi (JP)

( * ) Notice: Subject to any disclaimer, the term of this patent is extended or adjusted under 35 U.S.C. 154(b) by 1334 days.

(21) Appl. No.: 12/221,453

(22) Filed: Jul. 31, 2008

(65) Prior Publication Data

US 2009/0042506 A1 Feb. 12, 2009

(30) Foreign Application Priority Data

Jul. 31, 2007 (JP) ................... 2007-199960

(51) Int. Cl.
*F24F 13/14* (2006.01)
*B60S 1/54* (2006.01)

(52) U.S. Cl.
USPC ............ 454/336; 454/121; 454/122; 454/339

(58) Field of Classification Search
USPC .......................... 454/121–122, 339
See application file for complete search history.

(56) References Cited

U.S. PATENT DOCUMENTS 6,244,335 B1 * 6/2001 Nakamura et al. ............ 165/203

FOREIGN PATENT DOCUMENTS

| DE | 10 2006 016 483 | 7/2007 |
| FR | 2 480 892 | 10/1981 |
| JP | 06-106956 | 4/1994 |
| JP | 2004-098727 | 4/2004 |
| JP | 2004-249826 | 9/2004 |

* cited by examiner

*Primary Examiner* — Steven B McAllister
*Assistant Examiner* — Helena Kosanovic
(74) *Attorney, Agent, or Firm* — Flynn, Thiel, Boutell & Tanis, P.C.

(57) ABSTRACT

A structure for connecting an air-conditioning duct to an air-conditioning unit; the air-conditioning unit 1 having a first air supply outlet 11 and a second air supply outlet 12 adjacent with each other, the air-conditioning duct having a first air passage and a second air passage adjacent with each other, wherein the first air supply outlet 11 and the second air supply outlet 12 include a U-shaped auxiliary wall 2 having a notched part K at one side therearound, a supply outlet boundary wall 130 separating the first air supply outlet 11 and the second air supply outlet 12, and a duct side step part Z is formed between an opening rim of a first duct 31 and an opening rim of a second duct 32, the duct side step part Z is contacted with is contacted with the supply outlet boundary wall 130 to install the air-conditioning duct 2 to the air-conditioning unit 1.

6 Claims, 4 Drawing Sheets

STRUCTURE FOR INSTALLING AIR-CONDITIONING DUCT TO AIR-CONDITIONING UNIT

BACKGROUND OF THE INVENTION

1. Field of the Invention

The present invention relates to a structure for installing an air-conditioning duct to a supply outlet of an air-conditioning unit mounted on vehicles.

2. Description of the Related Art

Currently, air-conditioning in vehicles are performed by using an air-conditioning duct to supply air-conditioning air discharged from an air-conditioning unit for vehicles to a predetermined position inside a vehicle and blow off the air.

Ordinary air-conditioning units are provided with two supply outlets for air-conditioning air, and each of them are installed with a duct for supplying the air-conditioning air to a different position.

Recently, in addition, some air-conditioning units are provided with a plurality of supply outlets to discharge air-conditioning air with different temperatures.

Wide variety of methods for installing an air-conditioning duct to an air-conditioning unit have been used, and for example, JP. A. 6-106956 discloses a method for fitting one air-conditioning duct and other air-conditioning duct with a pawl part in advance to be integrally fixed, and then, connecting the integrated air-conditioning duct to the supply outlet.

In addition, JP. A. 2004-98727, A discloses a method using an air-conditioning case for sliding and fixing one end of an air-conditioning duct to an air-conditioning unit when installing a unit, such as an instrument panel, to which the air-conditioning duct is connected on a vehicle.

FIG. 5 shows a conventional example with respect to a method for installing an air-conditioning duct to a supply outlet according to the present invention.

According to this example, two air-conditioning ducts 101 and 102 are incorporated in advance to form a fixed unit.

A supply outlet 202 of the air-conditioning unit is formed in a state where a part (the front surface of the orbit for installing the duct indicated by an arrow) that is notched (a notched part K.) Subsequently, an air-conditioning duct unit 100 is moved closer to the supply outlet from the direction in which the notched part K is formed, and outer peripheral faces of the air-conditioning duct 100 is contacted with inner periphery faces of the supply outlets 201 and 202 for connection.

In the connecting method shown in FIG. 5, a supply outlet boundary edge 200A of the air-conditioning unit and a boundary edge 100A of the air-conditioning duct are butt-jointed in almost line-contacted state.

Therefore, so-called an air leakage phenomenon, where air-conditioning air discharged from one supply outlet 201 flows into a duct 102, or air-conditioning air discharged from other supply outlet 202 flows into a duct 101, can easily occurs.

In order to prevent the air leakage phenomenon, a joining section of the supply outlet boundary edge 200A of the air-conditioning unit and the boundary edge 100A of the air-conditioning duct must be provided with a seal material.

In order to install the seal material to the joining section of the supply outlet boundary edge 200A of the air-conditioning unit and the boundary edge 100A of the air-conditioning duct, the seal material must be installed to the supply outlet boundary edge 200A of the air-conditioning unit or the boundary edge 100A of the air-conditioning duct before performing a connecting operation.

However, even if the seal material is installed on the supply outlet boundary edge 200A of the air-conditioning unit or the boundary edge 100A of the air-conditioning duct, due to an extremely small contact area of the supply outlet boundary edge 200A of the air-conditioning unit and the boundary edge 100A of the air-conditioning duct, a connecting state is unstable depending on assembly conditions.

Furthermore, the seal material may be peeled off from the boundary edge when assembling, and enough sealing property may not be ensured.

Therefore, maintaining the assembled state so as to prevent the air leakage phenomenon is difficult.

The present invention was developed to solve the above-mentioned problems.

That is, an object of the present invention is to provide a structure for installing an air-conditioning duct to an air-conditioning unit so as to prevent an air leakage phenomenon.

SUMMARY OF THE INVENTION

The present inventors have made keen studies based on the background as described above, and found that the above-mentioned subject can be solved by changing the shape of a joining section of an air-conditioning unit and an air-conditioning duct, and have completed the present invention based on the findings.

That is, the present invention relates to a structure for installing an air-conditioning duct to an air-conditioning unit, wherein the air-conditioning unit has a first air supply outlet and a second air supply outlet adjacent with each other, and the air-conditioning duct has a first air passage and a second air passage adjacent with each other, wherein the first air supply outlet and the second air supply outlet include a U-shaped auxiliary wall having a notched part at one side therearound and a supply outlet boundary wall separating the first air supply outlet and the second air supply outlet, and a duct side step part formed between an opening rim of the first duct and an opening rim of the second duct, the duct side step part is contacted with the supply outlet boundary wall to install the air-conditioning duct to the air-conditioning unit.

Further, the present invention also relates to a structure for installing an air-conditioning duct to an air-conditioning unit, wherein the duct side step part is formed by the opening rim of the first duct projecting farther than the opening rim of the second duct.

The present invention also relates to a structure for installing an air-conditioning duct to an air-conditioning unit, wherein an air-conditioning side step part formed on the supply outlet boundary wall, the air-conditioning side step part is formed with an opening rim of the second air supply outlet shorter than an opening rim of the first air supply outlet, and the duct side step part is contacted with the air-conditioning side step part to install the air-conditioning duct to the air-conditioning unit.

The present invention also relates to a structure for connecting an air-conditioning duct to an air-conditioning unit, wherein the size of the air-conditioning side step part is equal to that of the duct side step part.

The present invention also relates to a structure for installing an air-conditioning duct to an air-conditioning unit, wherein the distance between the upper end of the U-shaped auxiliary wall and the upper end of the supply outlet boundary wall is shorter than the distance between the upper end of the U-shaped auxiliary wall and the upper end of the notched part.

The present invention also relates to a structure for connecting an air-conditioning duct to an air-conditioning unit, wherein the supply outlet boundary wall and the duct side step part are contacted via a seal material.

The present invention also relates to a structure for connecting an air-conditioning duct to an air-conditioning unit, wherein the air-conditioning duct is installed to the air-conditioning unit by sliding through the notched part.

Combining the above-mentioned aspects appropriately can be employed without deviating from the object of the present invention.

According to a structure for installing an air-conditioning duct to an air-conditioning unit of the present invention, an air-conditioning duct can be installed to a supply outlet of an air-conditioning unit without causing an air leakage phenomenon.

In addition, an air-conditioning duct having a plurality of air passages can be installed to an air-conditioning unit with high air-tightness maintained by connecting in the sliding direction.

When an air-conditioning side step part provided on the air-conditioning unit and a duct side step part provided on the air-conditioning duct both have the same size, positioning in connecting the air-conditioning duct to the air-conditioning unit becomes easier, and a joining section with a certain area and stable airtightness can be ensured.

DESCRIPTION OF THE PREFERRED EMBODIMENTS

[First Embodiment]
(Structure of an Air-Conditioning Unit)

An embodiment of the present invention will be described with reference to the drawings.

FIG. 1 is a perspective view of a supply outlet of an air-conditioning unit and an air-conditioning duct installed to the supply outlet according to the present embodiment.

Figure 1A:
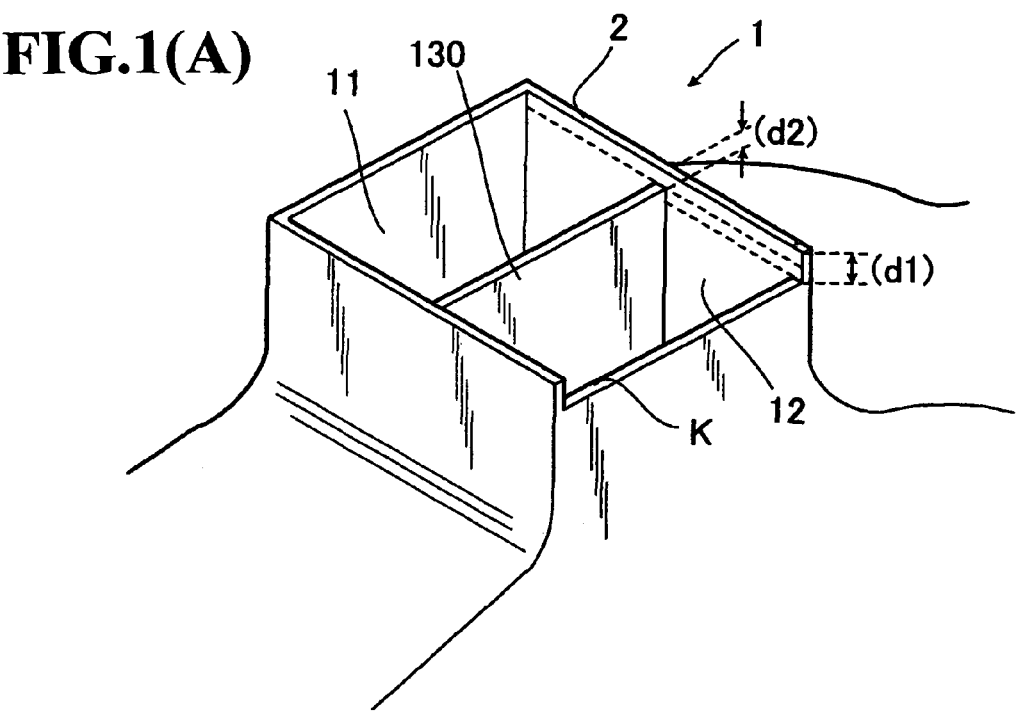
FIG. 1 is a perspective view of a supply outlet of an air-conditioning unit and an air-conditioning duct installed to the supply outlet according to the first embodiment.

As shown in FIG. 1A, an air-conditioning unit 1 (so-called "an HVAC module") according to the present embodiment includes a first air supply outlet 11 having a rectangular shape and a second air supply outlet 12 having a rectangular shape, and generally, air-conditioning air with different temperatures is supplied from the first air supply outlets 11 and the second air supply outlet 12.

The first air supply outlet 11 and the second air supply outlet 12 include a U-shaped auxiliary wall 2 having a notched part K at one side therearound, and a supply outlet boundary wall 130 separating the first air supply outlet 11 and the second air supply outlet 12.

The first air supply outlet 11 and the second air supply outlet 12 are located side-by-side with the supply outlet boundary wall 130 therebetween, and wall face heights of the supply outlets of the air-conditioning unit 1 are formed in the order of the wall face with the notched part K, the supply outlet boundary wall 130, and the U-shaped auxiliary wall 2 with the wall with the notched part K lowest.

That is, the distance (d2) between the upper end of the U-shaped auxiliary wall 2 and that of the supply outlet boundary wall 130 is shorter than the distance (d1) between the upper end of the U-shaped auxiliary wall 2 and that of the notched part K.

(Structure of an Air-Conditioning Duct)

Figure 1B:
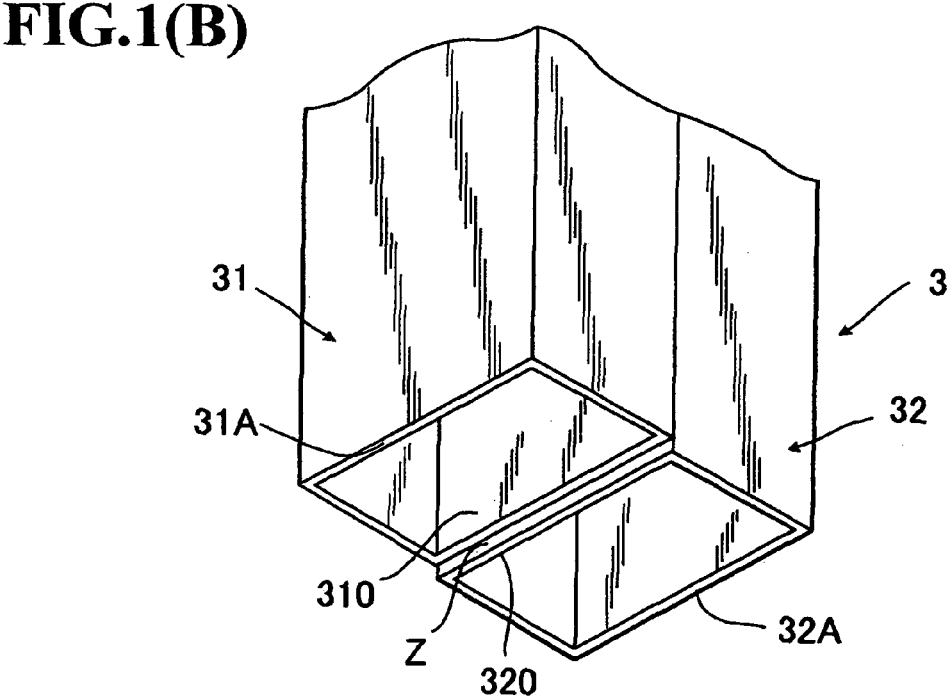

As shown in FIG. 1B, an air-conditioning duct 3 according to the present embodiment is provided with a first duct 31 having a rectangular shape and a second duct 32 having a rectangular shape.

The first duct 31 forms a first air passage of the air-conditioning duct, and the second duct 32 forms a second air passage of the air-conditioning duct. The shape of the opening of the first duct 31 consists with that of the first air supply outlet 11, and similarly, the shape of the opening of the second duct 32 consists with that of the second air supply outlet 12.

When connecting the air-conditioning duct 3 to the air-conditioning unit 1, the first duct 31 is connected to the first air supply outlet 11, and the second duct 32 is connected to the second air supply outlet 12 so as to correspond each other.

Since the opening rim 32A of the second duct 32 is formed longer than the opening rim 31A of the first duct 31, a duct side step part Z is formed between the boundary wall 310 of the first duct 31 and the boundary wall 320 of the second duct 32.

The boundary wall 310 of the first duct 31 indicates a peripheral wall adjacent to the second duct 32 among the peripheral walls forming the first duct 31.

Similarly, the boundary wall 320 of the second duct 32 indicates a peripheral wall adjacent to the first duct 31 among the peripheral walls forming the second duct 32.

The duct side step part Z contacts the supply outlet boundary wall 130 via a seal material when connecting the air-conditioning duct 3 to the air-conditioning unit 1.

A procedure for connecting the air-conditioning duct 3 to the air-conditioning unit 1 will be described next.

Figure 2:
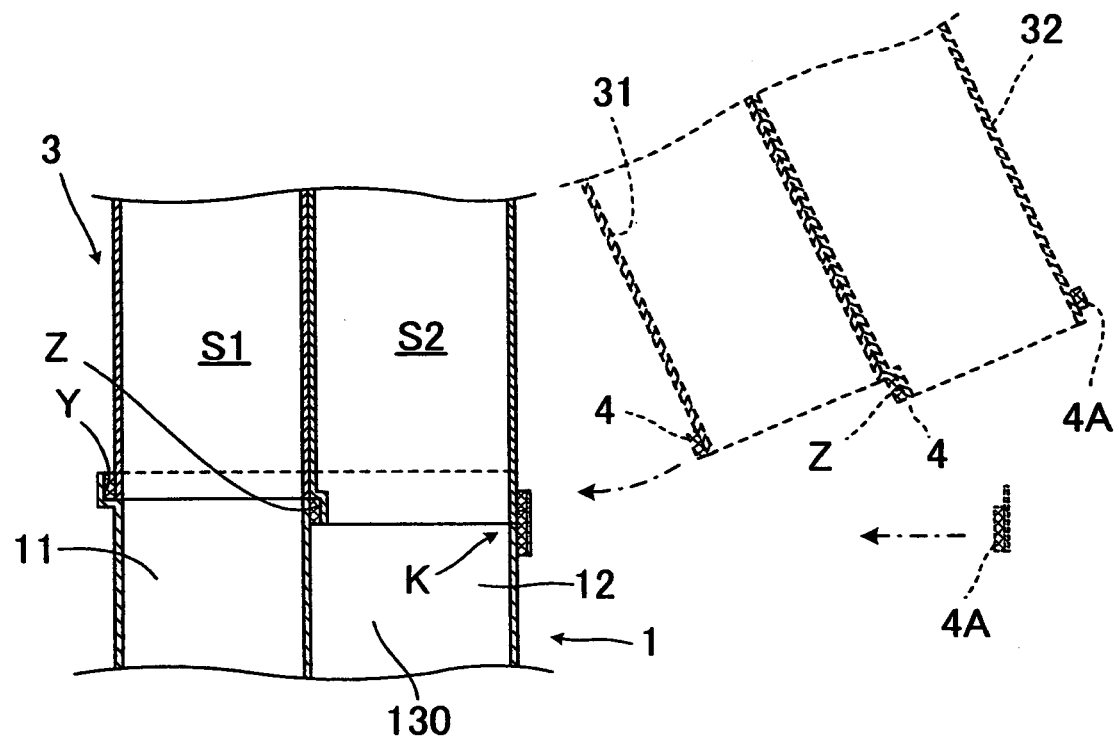
FIG. 2 is a cross sectional view showing a state in which the air-conditioning duct is installed to the air-conditioning unit according to the first embodiment.

FIG. 2 is a cross sectional view showing a state in which an air-conditioning duct 1 is installed to an air-conditioning unit 3.

Initially, in order to prevent an air leakage from the joining section of the first air supply outlet 11 and the first duct 31, and the joining section of the second air supply outlet 12 and the second duct 32, before installing the air-conditioning duct 3 to the air-conditioning unit 1, as shown in FIG. 2, a seal material 4 is installed in advance at least on the front face of the first duct 31, and on the stepped part Z of the second duct 32.

A packing made from polyurethane or the like is employed as the seal material 4.

The seal material 4 is preferably fixed to a predetermined position of each duct by methods of adhesion and the like.

Types of the seal material 4 are not particularly limited.

Subsequently, the air-conditioning duct 3 is slid toward the supply outlet of the air-conditioning unit 1. That is, the air-conditioning duct 3 is slid from the side of the second air supply outlet 12 to pass through the notched part K.

Wall face heights of the supply outlets of the air-conditioning unit 1 is formed in the order of the wall face with the notched part K, the supply outlet boundary wall 130, and the U-shaped auxiliary wall 2 with the wall with the notched part K lowest, and an opening end 31A of the first duct 31 is formed so as to be shorter than an opening end 32A of the second duct 32.

Therefore, the front face of the first duct 31 passes through the notched part K and the supply outlet boundary wall, and advances to a position to contact the U-shaped auxiliary wall 2 on the side of the first air supply outlet.

At the same time, the air-conditioning duct 3 passes through the notched part K, and advances to a position in which the stepped part Z contacts the supply outlet boundary wall 130.

Thereby, the front face of the first duct 31 passes through the notched part K to contacts the inner periphery face of the U-shaped auxiliary wall 2 via the seal material 4, and the duct side step part Z contacts the supply outlet boundary wall 130 of the air-conditioning unit 1 via the seal material 4.

As a result, the air-conditioning unit 1 and the air-conditioning duct 3 are connected with joining sections having certain areas except for the side with the notched part K.

Finally, the air-conditioning duct 3 is airtightly connected to the air-conditioning unit 1 by sticking the seal material 4A so as to cover a bonded surface of the second air supply outlet 12 and the second duct 32 on the side of the notched part K.

Thus, the duct side step part Z is provided on the air-conditioning duct 3 to ensure enough space for sticking the seal material 4, and achieves reliable and stable adhesion of the seal material 4.

Furthermore, the duct side step part Z and the supply outlet boundary wall 130 are connected by contacting surfaces thereof, reliable sealing property between an air flow passage S1 formed with the first air supply outlet 11 and the first duct 31 and an air flow passage S2 formed with the second air supply outlet 12 and the second duct 32 can be obtained, and an occurrence of air leakage phenomenon is reliably prevented.

In the present invention, since the air-conditioning duct 3 is slid to install to the air-conditioning unit 1, when the front face of the first duct 31 is connected in contact with the inner periphery face of the U-shaped auxiliary wall 2, the whole perimeter is simultaneously connected except for the side with the notched part K of the air-conditioning duct 3, and sealing only the side with the notched part K at the end efficiently connects the air-conditioning duct 3 to the air-conditioning unit 1.

Preferably, a projection is provided on the wall surface of the air-conditioning duct 3, and a guide groove for receiving the projection provided on the air-conditioning duct 3 is provided on the wall surface of the U-shaped auxiliary wall 2.

Since the projection of the air-conditioning duct 3 is guided to the guide groove of the U-shaped auxiliary wall 2, the air-conditioning duct 3 can be easily slid and inserted to the inside of the U-shaped auxiliary wall 2.

As a result, separation of the seal material on the wall surface of the air-conditioning duct 3 by friction generated with the U-shaped auxiliary wall 2 while sliding is prevented.

[Second Embodiment]

Other embodiment in the present invention will be described with reference to the drawings. FIG. 3 is a perspective view of a supply outlet of an air-conditioning unit in the present embodiment.

Figure 3A:
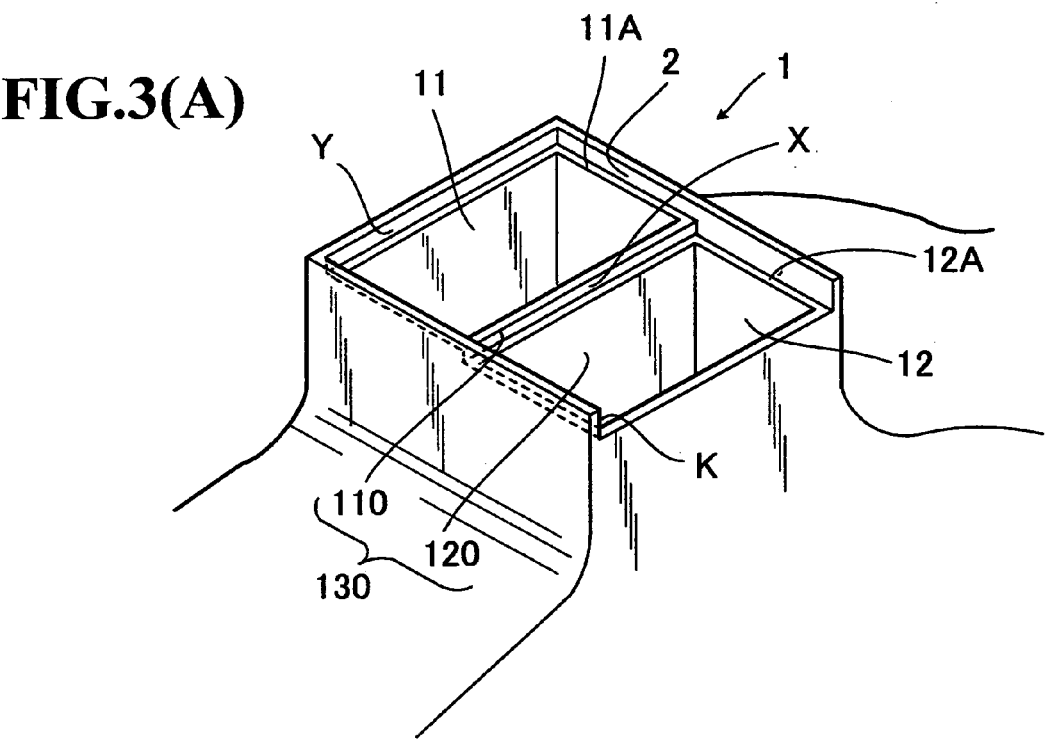
FIG. 3 is a perspective view of a supply outlet of an air-conditioning unit and an air-conditioning duct installed to a supply outlet according to the second embodiment.
Figure 3B:
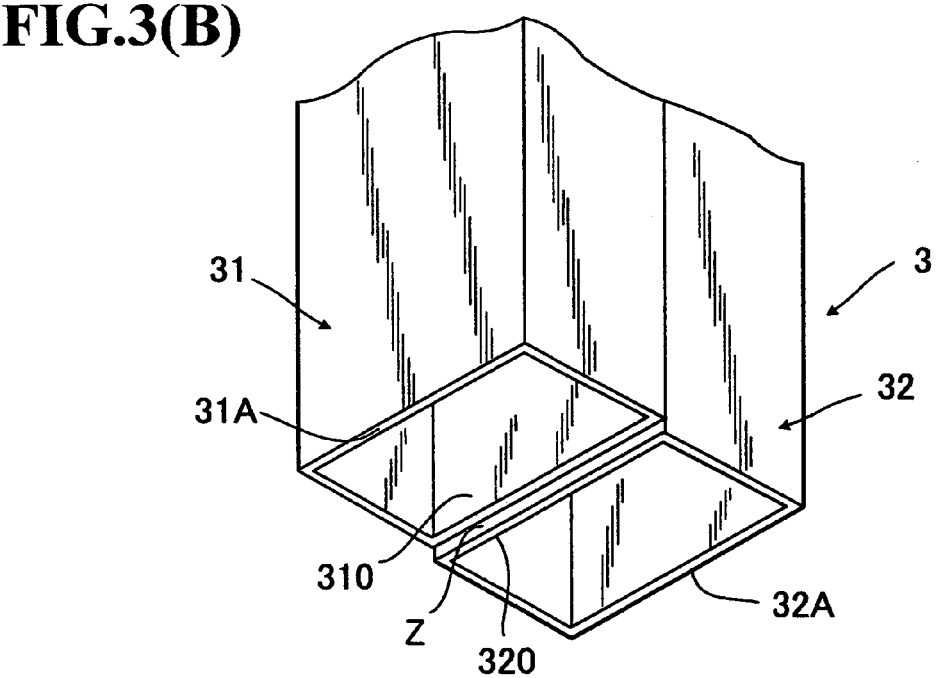

As shown in FIG. 3A, an air-conditioning unit 1 in the present embodiment includes an opening rim 12A of a second air supply outlet 12 disposed lower than an opening rim 11A of a first air supply outlet, and therefore, a supply outlet boundary wall 130 formed with a boundary wall 110 of the first air supply outlet 11 and a boundary wall 120 of the second air supply outlet 12 is provided with a stepped part X (hereinafter, referred to as an "air-conditioning side step part").

The size of the air-conditioning side step part X is equal to that of a duct side step part Z of an air-conditioning duct 3.

The air-conditioning side step part X contacts the duct side step part Z via a seal material when installing the air-conditioning duct 3 to the air-conditioning unit 1.

The air-conditioning side step part X is formed on the supply outlet boundary wall 130 to make positioning of the air-conditioning duct 3 easier when connecting the air-conditioning duct 3 to the air-conditioning unit 1, and provides a joining section with a certain area and stable airtightness.

In addition, a U-shaped auxiliary wall 2 in the present embodiment is provided so as to surround the first air supply outlet 11 and the second air supply outlet 12, and to project from opening rims 11A and 12A in extending manner, and therefore, the whole inner periphery faces of the U-shaped auxiliary wall 2 work as a connection space Y with which a seal material 4 installed on the peripheral walls of the air-conditioning duct 3 contacts.

Figure 4:
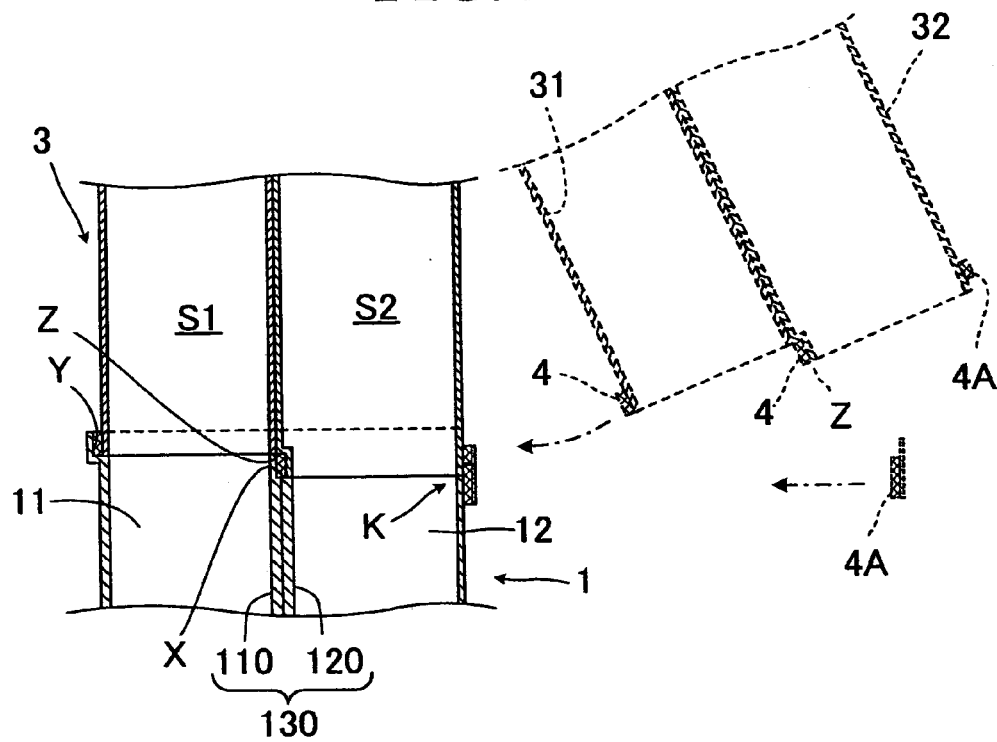
FIG. 4 is a cross sectional view showing a state in which the air-conditioning duct is connected to the air-conditioning unit according to the second embodiment.
Figure 5:
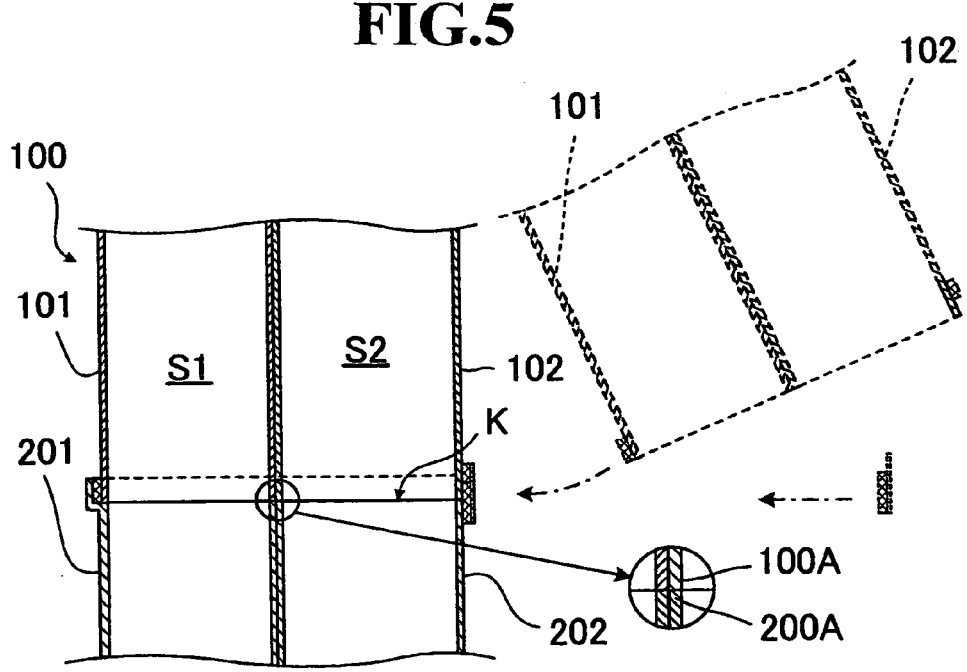
FIG. 5 is a cross sectional view showing a method of a conventional example for installing an air-conditioning duct to an air-conditioning unit.

A method for connecting the air-conditioning duct 3 to the supply outlet of the air-conditioning unit 1 in the second embodiment is the same as the method for connecting the air-conditioning duct 3 to the supply outlet of the air-conditioning unit 1 in the first embodiment mentioned above (See FIG. 4.) Although the present invention have been described as mentioned above, various modifications are possible without being restricted to these embodiments.

For example, although the seal material 4 is installed on the air-conditioning duct 3 in the embodiments, the seal material 4 can also be disposed on the air-conditioning 1.

Separate seal materials can also be used.

What is claimed is:

1. A structure for installing an air-conditioning duct to an air-conditioning unit, the structure for installing the air-conditioning duct having a first air passage and a second air passage abutting each other to the air-conditioning unit having a first air supply outlet and a second air supply outlet abutting each other, wherein the first air supply outlet and the second air supply outlet include a U-shaped auxiliary wall having a notched part at one side therearound so as to surround the first and second outlets on three sides and a supply outlet boundary wall separating the first air supply outlet and the second air supply outlet wherein one of said first and second supply outlets projects farther than the opening of the other of the first and second supply outlets, and a duct side step part is formed between an opening rim of a first duct and an opening rim of a second duct by forming the opening rim of the first duct to project outward farther than the opening rim of the second duct, the duct side step part is contacted with the supply outlet boundary wall to install the air-conditioning duct to the air-conditioning unit.

2. The structure for installing an air-conditioning duct to an air-conditioning unit according to claim 1, wherein an air-conditioning side step part is formed on the supply outlet boundary wall, the air-conditioning side step part is formed by forming an opening rim of the second air supply outlet shorter than an opening rim of the first air supply outlet, and the duct side step part is contacted with the air-conditioning side step part to connect the air-conditioning duct to the air-conditioning unit.

3. The structure for installing an air-conditioning duct to an air-conditioning unit according to claim 2, wherein the size of the air-conditioning side step part is equal to that of the duct side step part.

4. The structure for installing an air-conditioning duct to an air-conditioning unit according to claim 1, wherein a distance between an upper end of the U-shaped auxiliary wall and an upper end of the supply outlet boundary wall is shorter than a distance between the upper end of the U-shaped auxiliary wall and an upper end of the notched part.

5. The structure for connecting an air-conditioning duct to an air-conditioning unit according to claim 1, wherein the supply outlet boundary wall and the duct side step part are contacted via a seal material.

6. The structure for connecting an air-conditioning duct to an air-conditioning unit according to claim 1, wherein the air-conditioning duct is installed to the air-conditioning unit by sliding through the notched part.

* * * * *